(12) United States Patent
Zhang et al.

(10) Patent No.: US 10,325,358 B2
(45) Date of Patent: Jun. 18, 2019

(54) METHOD AND SYSTEM FOR IMAGE DE-BLURRING

(71) Applicant: Peking University Shenzhen Graduate School, Shenzhen (CN)

(72) Inventors: Xinxin Zhang, Shenzhen (CN); Ronggang Wang, Shenzhen (CN); Zhenyu Wang, Shenzhen (CN); Wen Gao, Shenzhen (CN)

(73) Assignee: Peking University Shenzhen Graduate School, Shenzhen (CN)

( * ) Notice: Subject to any disclaimer, the term of this patent is extended or adjusted under 35 U.S.C. 154(b) by 38 days.

(21) Appl. No.: 15/571,659

(22) PCT Filed: May 15, 2015

(86) PCT No.: PCT/CN2015/079039
§ 371 (c)(1),
(2) Date: Nov. 3, 2017

(87) PCT Pub. No.: WO2016/183716
PCT Pub. Date: Nov. 24, 2016

(65) Prior Publication Data
US 2018/0137606 A1    May 17, 2018

(51) Int. Cl.
G06K 9/40      (2006.01)
G06T 5/00      (2006.01)
G06T 7/11      (2017.01)
G06T 7/13      (2017.01)
G06K 9/46      (2006.01)
G06T 5/20      (2006.01)
G06T 7/12      (2017.01)

(52) U.S. Cl.
CPC ............ G06T 5/003 (2013.01); G06K 9/4671 (2013.01); G06T 5/20 (2013.01); G06T 7/11 (2017.01); G06T 7/12 (2017.01); G06T 7/13 (2017.01); *G06T 2207/20164* (2013.01)

(58) Field of Classification Search
CPC .................. G06K 9/4671; G06K 9/40; G06T 2207/20164; G06T 5/003; G06T 5/20; G06T 7/11; G06T 7/12; G06T 7/13
See application file for complete search history.

(56) References Cited

U.S. PATENT DOCUMENTS

| | | | |
|---|---|---|---|
| 2010/0166332 A1* | 7/2010 | Lee | G06K 9/40 |
| | | | 382/255 |
| 2014/0140626 A1* | 5/2014 | Cho | G06T 5/003 |
| | | | 382/199 |

* cited by examiner

*Primary Examiner* — Xin Jia
(74) *Attorney, Agent, or Firm* — SV Patent Service

(57) ABSTRACT

A method for image de-blurring includes estimating an intermediate image L by marking and constraining an edge region and a smooth region in an input image; estimating a blur kernel k by extracting salient edges from the intermediate image L, wherein the salient edges have scales greater than those of the blur kernel k; and restoring the input image to a clear image by performing non-blind deconvolution on the input image and the estimated blur kernel k. Imposing constraints on the edge region and the smooth region allows the intermediate image to maintain the edge while effectively removing noise and ringing artifacts in the smooth region. The use of the salient edges in the intermediate image L enables more accurate blur kernel estimation. Performing non-blind deconvolution on the input image and the estimated blur kernel k restores the input image to a clear image achieving desired de-blurring effect.

6 Claims, 3 Drawing Sheets (a)          (b)          (c)

METHOD AND SYSTEM FOR IMAGE DE-BLURRING

TECHNICAL FIELD

The present invention relates to the field of image enhancement, and in particular, to a method and a system for image de-blurring.

BACKGROUND OF THE INVENTION

Due to the movement of the camera relative to the scene, the images taken often suffer motion blur to some extent. The image degradation model can be expressed as a convolution process as follows:

$$I = L \otimes k + N,$$

wherein I represents the acquired blurred image, L represents a clear image, k is a blur kernel (i.e. Point Spread Function (PSF)), and N represents the noise generated by the image acquisition device. Since only the blurred image I is known, the process to restore a clear image L from a blurred image is a large-scale ill-posed inverse problem.

As motion de-blurring of a single image is valuable to many applications, it has attracted much attention. There have been various motion de-blurring algorithms to solve the ill-posed problem of obtaining a clear image L. For example, Fergus et al. expressed the long-tailed distribution model of the gradient of natural image as a Gaussian Mixture Model (GMM), which was used for constraining the clear image L. The clear image L was obtained by using the ensemble learning method. Shan et al. expressed the long-tailed distribution as a piecewise function to constrain the gradient of the clear image L. Krishnan et al. assumed that the gradient of the clear image L followed the hyper-Laplacian distribution, and obtained a high-quality reconstructed image. The hyper-Laplacian constraint is widely used as a valid constraint in later de-blurring works. Pan et al. constrained the clear image L and the blur kernel k by using a low-rank constraint term and the Gaussian regularization term respectively. Although the continuity of the blur kernel k is guaranteed to some extent, the use of a threshold parameter to remove noise in blur kernel k also affects its continuity.

Moreover, the selection of the salient edge of image largely affects the accuracy of blur kernel k estimation. Research has found that accurate blur kernel estimation can be obtained only in images in which the edge sizes are larger than the scale of the blur kernel k; otherwise, blur kernel estimation becomes inaccurate. Hence, the selection of proper edge information is critical to blur kernel estimation. Cho and Lee extracted sharp edges with bilateral filters and shock filters, but it was difficult to control the scale of the edges, thus was detrimental to the estimation of blur kernel k. Xu and Jia proposed a method for measuring the scale of the edge, which could effectively extract useful salient edges. Pan et al. made an improvement based on the salient edge selection method, which made selected edges more effective. Unlike the dedicated salient edge extraction method, Xu and Pan et al. used $l_0$ constraint to maintain the main structure in the restored intermediate image L for blur kernel k estimation and achieved good results.

However, many problems remain in both blur kernel estimation and non-blind deconvolution in the final image, and it is necessary to further improve the effect of image de-blurring.

SUMMARY OF THE INVENTION

According to an aspect of the present invention, a method for image de-blurring is provided, comprising the steps of: computing an intermediate image L, comprising: marking an edge region and a smooth region in an input image; and constraining the edge region and the smooth region to obtain the intermediate image L, wherein the input image is an original blurred image;

estimating a blur kernel k, comprising: extracting salient edges from the intermediate image, wherein the salient edges have their edge sizes larger than the scale of the blur kernel k; and calculating the blur kernel k using the salient edges; and restoring the input image, comprising: performing non-blind deconvolution on the input image and the estimated blur kernel k; and restoring the input image to a clear image.

According to another aspect of the present invention, a system for image de-blurring is provided, including:

a first estimation module that can mark an edge region and a smooth region in an input image and to constrain the edge region and the smooth region to obtain an intermediate image L, wherein the input image is an original blurred image;

a second estimation module that can extract salient edges from the intermediate image, wherein the salient edges have their edge sizes larger than the scale of the blur kernel k, wherein the second estimation module can calculate the blur kernel k using the salient edges; and a restoring module that can perform non-blind deconvolution on the input image and the estimated blur kernel k and to restore the input image to a clear image.

The presently disclosed image de-blurring method first marks the edge region and the smooth region of an input image in obtaining of intermediate image L, and then imposes constraints on the edge region and the smooth region, which allows the obtained intermediate image to maintain the edges while effectively removing noise and ringing artifacts of the smooth region. Moreover, the use of the salient edge of the intermediate image L to calculate the blur kernel enables more accurate blur kernel estimation. Furthermore, the disclosed method performs non-blind deconvolution on the input image and the estimated blur kernel k to restore the input image to a clear image, which achieves a desired de-blurring effect.

DETAILED DESCRIPTION OF THE INVENTION

In some embodiments, a single image is de-blurred, mainly including blur kernel k estimation and image restoration. A robust constraint I used impose constraints on the blur kernel k estimation and intermediate image L restoration to obtain an accurate blur kernel k and a high-quality restored image.

Figure 1:
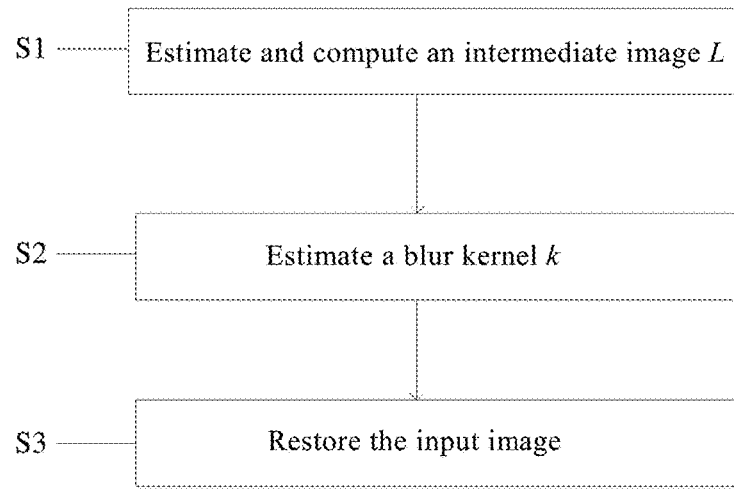
FIG. 1 is a flowchart for a method of image de-blurring in accordance with the present invention.

A method for image de-blurring is provided in the present example, with its flowchart shown in FIG. 1, comprising the steps of:

S1: Estimating and Computing an Intermediate Image L.

An image pyramid is constructed before estimating the intermediate image L. In particular, an image pyramid corresponding to the input image is constructed. The input image is the original blurred image I, wherein the image pyramid is a structure that describes the image in multiple resolutions. An image pyramid is an image set with a series of gradually reduced resolutions, in a pyramid form. Thus, the image pyramid model in the present embodiment is an image set of blurred images I with a series of gradually reduced resolutions.

While the image pyramid is constructed, a blur kernel k is initialized into a 3*3 matrix.

When the intermediate image L is estimated, an edge region and a smooth region of an input image are first marked. The marking process is as follows. The edge region of the input image is first detected by the Canny operator, to obtain the edge image; and then a disk model is used to dilate the edge image using the width of the blur kernel as the radius of the disk. The edge region and the smooth region are constrained by the hyper-Laplacian sparse term and the smoothing term to obtain the intermediate image L. Details of the calculation process are as follows.

The intermediate image L is estimated by using the degradation model of the image motion blur, and the constraints on the edge region and the smooth region. The calculation model of the intermediate image L is as follows:

$$\min_{L} \|L \otimes k - I\|_2^2 + \lambda_1 \|\nabla L\|^{0.5} \circ M + \lambda_2 \|\nabla L\|_2^2 \circ (J - M);$$

wherein $\nabla L = (\partial_x L, \partial_y L)^T$ is the gradient of the intermediate image L, I is a blurred image, and $\lambda_1$ and $\lambda_2$ are weighting factors, where $\lambda_1$ is set as 0.05 and $\lambda_2$ is set as 1. The symbol ∘ represents element-wise multiplication, the symbol ⊗ represents convolution operation, J is an all-ones matrix, M is the mark of the edge region and J-M is the mark of the smooth region. The edges of a series of blurred images in the image pyramid are detected using the Canny edge operator, and the expansion operation is performed. The pixel values of the edge region are marked as the first value, and the pixel values of the smooth region are marked as the second value different from the first value. Based on the test results, the pixel values of the image edge and the vicinity corresponding to the elements in M are set as 1, that is, the first value is 1. The pixel values of the smooth region corresponding to the elements in M are set as 0, that is, the second value is 0.

The first value and the second value are substituted into the calculation model for the intermediate image L. The calculation model is subject to cyclic iterations to obtain the minimum value of the calculation model with respect to the intermediate image L. Since the calculation model is a nonconvex function, the intermediate image L cannot be directly calculated. The half-quadratic normalization method is used in implementing the calculation model in the example. In particular, an auxiliary variable is introduced and substituted for the gradient of the intermediate image L, to transform the calculation model of the intermediate image L into an auxiliary model. For example, an auxiliary variable u instead of $\nabla L$ is used in the calculation model; the calculation model is transformed into the following auxiliary model:

$$\min_{L,u} \|L \otimes k - I\|_2^2 + \lambda_1 \|u\|^{0.5} \circ M + \lambda_2 \|u\|_2^2 \circ (J - M) + \lambda_3 \|\nabla L - u\|_2^2.$$

When the weighting coefficient $\lambda_3$ approaches ∞, the solution of the auxiliary model converges to the calculation model. Then u and L in the auxiliary model are solved using the cyclic iteration method, using a process is as follows:

The auxiliary variable in the auxiliary model is used as the unknown variable. The auxiliary model is simplified as a first auxiliary model that is calculated to obtain the auxiliary variable. For example, if u is unknown in the auxiliary model, that is, all the variables in the auxiliary model except u are set with known values, the auxiliary model is simplified as the first auxiliary model:

$$\min_{u} \lambda_1 \|u\|^{0.5} \circ M + \lambda_2 \|u\|_2^2 \circ (J - M) + \lambda_3 \|\nabla L - u\|_2^2;$$

The first auxiliary model can be calculated using Newton method to obtain the u value. Then taking u as the known value and L as the unknown, that is, the intermediate image L in the auxiliary model being unknown, the auxiliary model can be simplified as a second auxiliary model. The intermediate image L is obtained by calculating a second auxiliary model:

$$\min_{L} \|L \otimes k - I\|_2^2 + \lambda_3 \|\nabla L - u\|_2^2;$$

The L value can be calculated by minimizing the second auxiliary model. In the present implementation, based on the Pascal's theorem, L is solved by using fast Fourier transform.

$$L = F^{-1} \left( \frac{F(I) \circ \overline{F(k)} + \lambda_3 F(u) \circ \overline{F(\nabla)}}{F(k) \circ \overline{F(k)} + \lambda_3 F(\nabla) \circ \overline{F(\nabla)}} \right);$$

wherein F and $F^{-1}$ represent the fast Fourier transform and its inverse transform, respectively, and $\overline{(\square)}$ represents the conjugate operation. Cyclic iterations are performed on the first auxiliary model and the second auxiliary model until the appropriate intermediate image L is obtained. For example, after performing 20 times of cyclic iteration, an appropriate intermediate image L can be obtained.

S2: Estimating Blur Kernel k.

Salient edges of the intermediate image L are extracted. The selection of the salient edge of image can affect accuracy of blur kernel k estimation significantly. For example, it is found that only the edges with sizes greater than the blur kernel k can produce relative accurate blur kernel k estimation; while images having edge sizes smaller than the blur kernel k lead to inaccurate blur kernel k estimation. In the present example, those salient edges whose sizes are larger than the scale of the blur kernel are used to calculate the blur kernel k.

In particular, a salient edge X of the intermediate image L is extracted using the Related Total Variation (RTV) structure extraction algorithm. A truncation parameter t is set to remove minor edges and noise in the salient edge X, to obtain an edge gradient image $\nabla S$ for blur kernel k estimation:

$$\nabla S = \nabla X \circ H(\|\nabla X\|_2 - t), \text{ wherein } H(\cdot) \text{ is the Heaviside function and } t \text{ is a threshold.}$$

The blur kernel k is calculated using the edge gradient image ∇S in combination with the sparse constraint and smooth constraint. The calculation model of the blur kernel k is as follows:

$$\min_{k} \|\nabla S \otimes k - \nabla I\|_2^2 + \gamma_1 \|k\|_2^2 + \gamma_2 \|\nabla k\|_2^2,$$

$$\text{s.t. } k(x) \geq 0, \ \Sigma k(x) = 1,$$

wherein $\|k\|_2^2$ is a Gaussian regularization term, which is used to guarantee the sparsity of the blur kernel k. $\|\nabla k\|_2^2$ is a gradient sparse term, which is used to remove the noise in the blur kernel k while maintaining the continuity of the blur kernel k. The weights $\gamma_1$ and $\gamma_2$ control the sparsity and the smoothness of the blur kernel k, respectively, wherein, $\gamma_1$ is set as 2. The energy equation is calculated using the fast Fourier transform, and the calculated blur kernel k is:

$$k = F^{-1}\left(\frac{F(\nabla I) \circ \overline{F(\nabla S)}}{F(\nabla S) \circ \overline{F(\nabla S)} + \gamma_2 F(\nabla) \circ \overline{F(\nabla)} + \gamma_1}\right).$$

Figure 2:
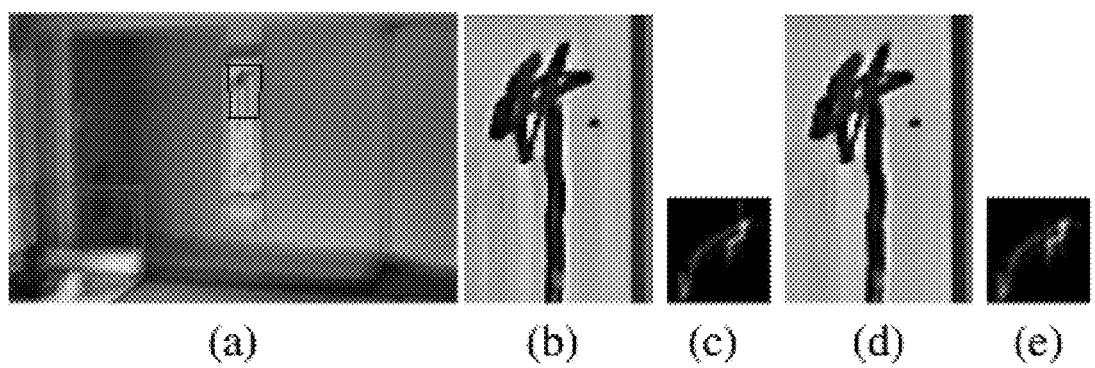
FIG. 2 illustrates the effect of the smoothness constraint to the blur kernel.

In the present embodiment, the blur kernel k is estimated by combining the sparse constraint and the smooth constraints, the sparsity and continuity are maintained, and the noise is reduced, as shown in FIGS. 2(*a*)-2(*e*). Wherein FIG. 2(*a*) is the blurred image I. FIG. 2(*b*) and FIG. 2(*c*) are portions of a restored image and the associated blur kernel k when $\gamma_2$=0. FIG. 2(*d*) and FIG. 2(*e*) are portions of a restored image and the associated blur kernel k when $\gamma_2$=50. It can be seen that the noise and block effect in FIG. 2(*d*) is smaller and there is less noise in the blur kernel k.

S3: Restoring the Original Input Image.

Non-blind deconvolution is performed based on the input image and the estimated blur kernel k, s to restore the input image to a clear image. The specific process is as follows.

In order to enhance the edges of the blurred image I, the blurred image I is subject to impact filtering to obtain an image Ĩ.

Figure 3:
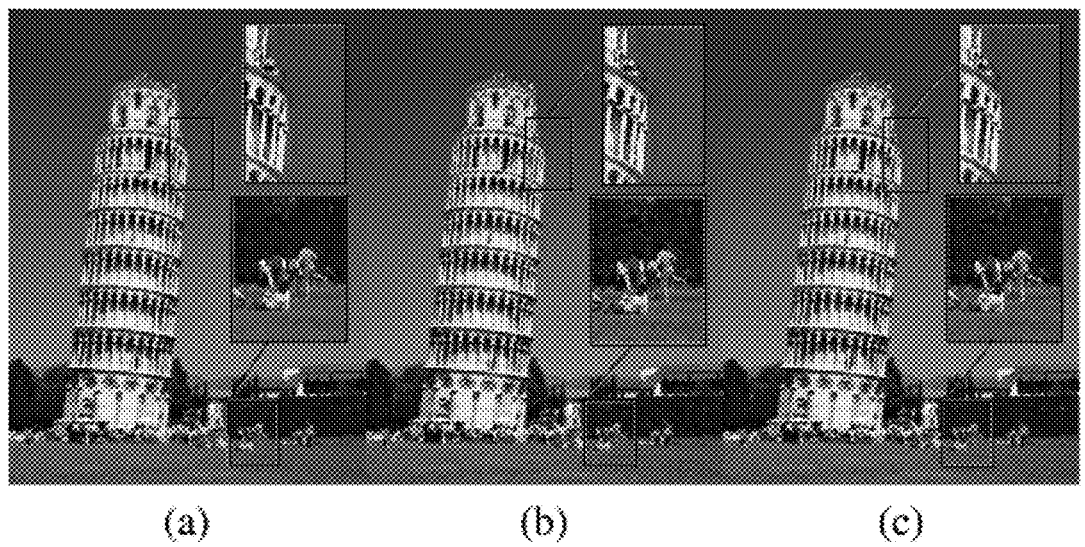
FIG. 3 illustrates the effect of image restoration.

Then, the non-blind deconvolution algorithm of the hyper-Laplacian model is used to conduct deconvolution of the estimated blur kernel k and the image Ĩ, that is, the minimum equation:

$$\min_{L_1} \|L_1 \otimes k - \tilde{I}\|_2^2 + \rho \|\nabla L_1\|^\alpha,$$

in which $\rho$ is set as 0.001, and 0.5<$\alpha$<0.8. The smaller $\alpha$ is, the smoother the first image $L_1$ obtained. The first image $L_1$ retains the main structure in the image. Although there is no noise or ringing artifacts, due to excessive smoothing, lots of high-frequency data is lost. The first image $L_1$ is shown in FIG. 3(*a*).

Further, the non-blind deconvolution algorithm of TV-$L_2$ model is used to conduct deconvolution of the estimated blur kernel k and the image Ĩ, that is, the minimum equation:

$$\min_{L_1} \|L_2 \otimes k - \tilde{I}\|_2^2 + \mu \|L_2\|_{TV},$$

in which $\mu$ is set as 0.001; $\|L_2\|_{TV} = \sqrt{(\partial_x L_2)^2 + (\partial_y L_2)^2}$. The second image $L_2$ is obtained. The effective high-frequency data remains in the second image $L_2$, but there are also noise and ringing artifacts. The second image $L_2$ is as shown in FIG. 3(*b*).

In order to preserve the high-frequency information in the clear image while removing the noise and the ringing artifacts, in some embodiments, the mean of the first image $L_1$ and the second image $L_2$ is taken as the final restored clear image. The mean of the first image $L_1$ and the second image $L_2$ is calculated, and is used as the final clear image as shown in FIG. 3(*c*). The final clear image combines the advantages of the first image $L_1$ and the second image $L_2$ while avoiding their disadvantages, featuring a high-quality restored image.

Figure 4:
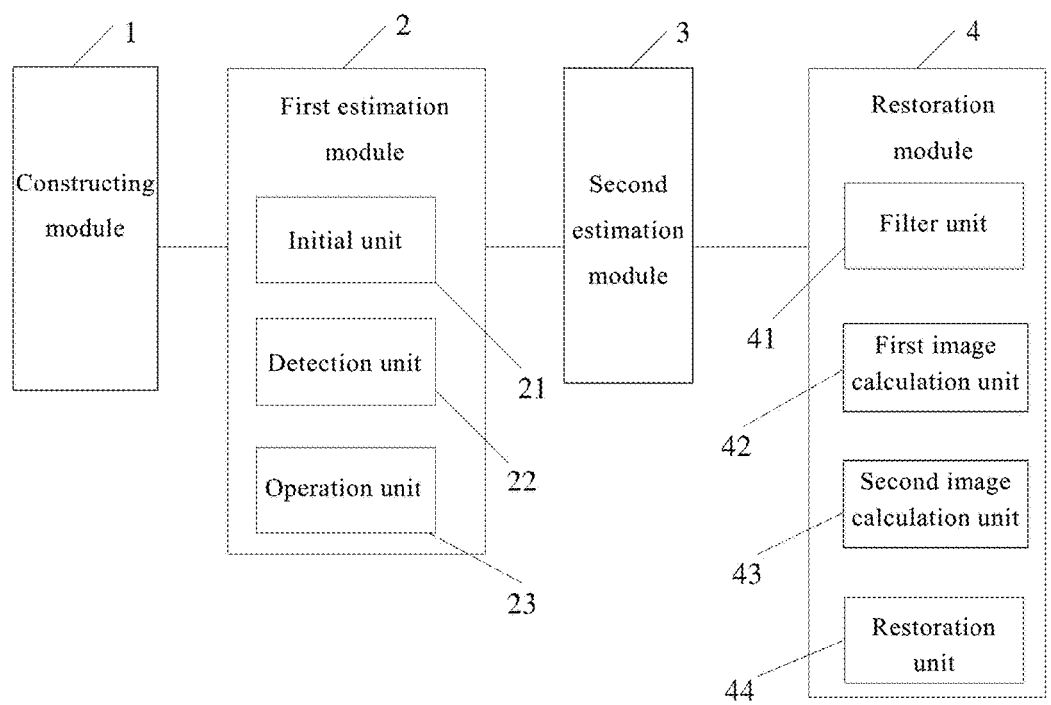
FIG. 4 illustrates a block diagram of the system for image de-blurring in accordance with the present invention.

According to the method for image de-blurring, a system for image de-blurring is further provided, with its schematic diagram shown in FIG. 4, includes a constructing module 1 that can construct an image pyramid corresponding to an input image, wherein the input image is the original blurred image; a first estimation module 2 that can constrain a marked edge region and a marked smooth region of the input image to obtain the intermediate image L; a second estimation module 3 that can extract a salient edge from the intermediate image L and to calculate the blur kernel k based on the salient edge, wherein the salient edge has a scale greater than the blur kernel k; and a restoring module 4 that can perform non-blind deconvolution based on the input image and the blur kernel k and to restore the input image to a clear image.

Further, the first estimation module 2 includes an initial unit 21, a detection unit 22, and an operation unit 23, wherein the initial unit 21 can initialize the blur kernel. The detection unit 22 can detect an edge in a series of blurred images in the image pyramid. The pixel values of the edge region are marked as the first value, and the pixel values of the smooth region are marked as the second value different from the first value. The operation unit 23 can substitute the first value and the second value into the calculation model of the intermediate image L. The calculation model is subject to cyclic iteration to obtain the minimum value of the calculation model relative to the intermediate image L. The first value and the second value are the same as the above-mentioned ones.

In particular, the operation unit 23 works as follows: 1) an auxiliary variable is introduced and substituted for the gradient of the intermediate image L. The calculation model of the intermediate image L is transformed into an auxiliary model. For example, the auxiliary variable u instead of ∇L is used in the calculation model of the intermediate image L. The calculation model of the intermediate image L is transformed into an auxiliary model, wherein the calculation model $$\min_{L} \|L \otimes k - I\|_2^2 + \lambda_1 \|\nabla L\|^{0.5} \circ M + \lambda_2 \|\nabla L\|_2^2 \circ (J - M)$$

is similar to the calculation model of the intermediate image L described above, and its specific parameters are not described again herein, wherein the auxiliary model:

$$\min_{L,u} \|L \otimes k - I\|_2^2 + \lambda_1 \|u\|^{0.5} \circ M + \lambda_2 \|u\|_2^2 \circ (J - M) + \lambda_3 \|\nabla L - u\|_2^2$$

is similar to the auxiliary model described above and its specific parameters are not described again herein.

2) The auxiliary variable in the auxiliary model is used as the unknown variable. The auxiliary model is simplified as the first auxiliary model. The first auxiliary model is calculated to obtain the auxiliary variable. For example, if u in the auxiliary model is unknown, other variables are set as the known values, the auxiliary model is simplified as the first auxiliary model:

$$\min_u \lambda_1 \|u\|^{0.5} \circ M + \lambda_2 \|u\|_2^2 \circ (J-M) + \lambda_3 \|\nabla L - u\|_2^2,$$

similar to the first auxiliary model described above. The operation unit 23 calculates the first auxiliary model by using the Newton method to obtain the value of u.

3) The intermediate image L in the auxiliary model is set as the unknown variable. The auxiliary model is simplified as a second auxiliary model. The second auxiliary model is calculated to obtain the intermediate image L. For example, taking u in the auxiliary model as the known value and L as the unknown, the auxiliary model is simplified as the second auxiliary model:

$$\min_L \|L \otimes k - I\|_2^2 + \lambda_3 \|\nabla L - u\|_2^2,$$

which is similar to the second auxiliary model described above. The value of L can be calculated by minimizing the second auxiliary model in the operation unit 23. The detailed process is described above.

4) Perform cyclic iterations on the first auxiliary model and the second auxiliary model until the appropriate intermediate image L is obtained. For example, 20 cyclic iterations can be performed.

The restoring module 4 includes a filter unit 41, a first image calculation unit 42, a second image calculation unit 43, and a restoration unit 44.

The filter unit 41 can conduct impact filtering of the blurred image I to obtain an image Ĩ, in order to enhance edges in the blurred image I, The first image calculation unit 42 can perform the non-blind deconvolution algorithm of the hyper-Laplacian model for deconvolution of the estimated blur kernel k and the image Ĩ, that is, using the minimum equation:

$$\min_{L_1} \|L_1 \otimes k - \tilde{I}\|_2^2 + \rho \|\nabla L_1\|^\alpha,$$

to obtain the first image $L_1$,

The second image calculation unit 43 can perform the non-blind deconvolution algorithm of TV-$L_2$ model for deconvolution of the estimated blur kernel k and the image Ĩ, that is, using the minimum equation:

$$\min_{L_1} \|L_2 \otimes k - \tilde{I}\|_2^2 + \mu \|L_2\|_{TV},$$

to obtain the second image $L_2$.

The restoring unit 44 can calculate a mean of the first image $L_1$ and the second image $L_2$, and use the mean to restore the input image into the final clear image.

The disclosed system for image de-blurring corresponds to the method for image de-blurring. The operations of each module of the system for image de-blurring will not be described further.

Figure 5:
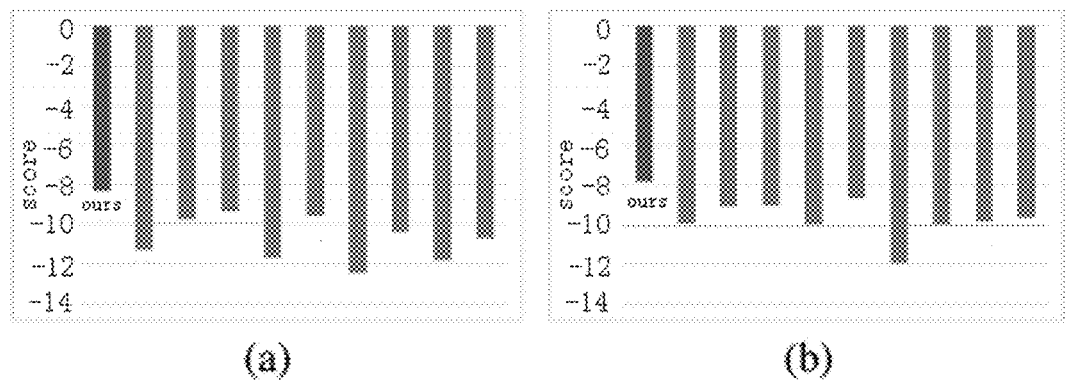
FIG. 5 illustrates results from evaluation of image restoration qualities.

In order to verify the effectiveness of the present invention, in some embodiments, a special no-reference motion de-blurring evaluation algorithm is used to evaluate artificial motion blurred images and actual motion blurred images for comparison with the existing 9 image de-blurring methods. The higher the score is, the higher the quality of the restored image is. For example, if image A and image B respectively have scores of −8 and −10, the quality of image A is higher than that of image B. The results of quality evaluation for image restoration are shown in FIG. 5. It can be seen that, the average score of the restored image of the presently disclosed system and method is the highest for each data set, indicating that the image de-blurring method according to the present invention provides high-quality restored image.

Figure 6:
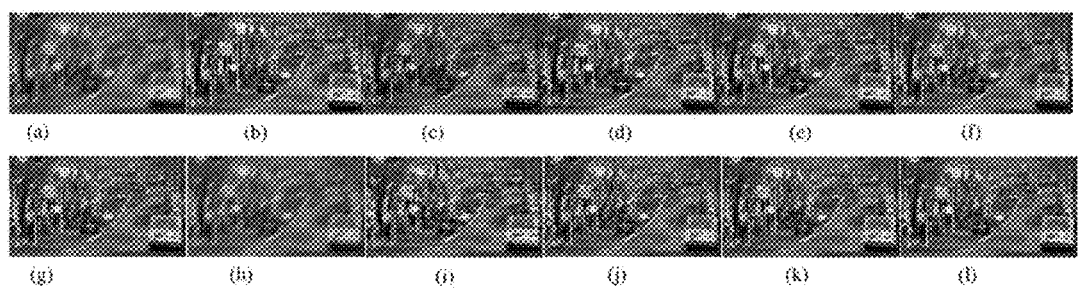
FIG. 6 illustrates comparison images showing the de-blurring effect on artificially blurred images.
Figure 7:
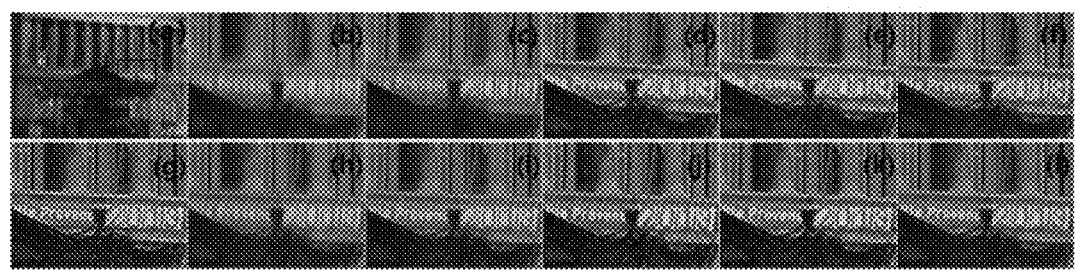
FIG. 7 illustrates comparison images showing the de-blurring effect on actual blurred images.

FIGS. 6(*a*)-6(*l*) illustrate comparison images showing the de-blurring effect on artificially blurred images. FIGS. 7(*a*)-7(*l*) illustrates comparison images showing the de-blurring effect on actual blurred images. FIGS. 6(*a*) and 7(*a*) illustrate the blurred images. FIG. 6(*b*) illustrates the actual image corresponding to the blurred image in FIG. 6(*a*). FIG. 7(*b*) illustrates the detailed image of that in the rectangular box in FIG. 7(*a*). FIGS. 6(*c*)~6(*k*) and 7(*c*)~7(*k*) are the effect of the restored images by using the existing 9 methods for image de-blurring. FIG. 6(*l*) and FIG. 7(*l*) illustrate the effect of the image de-blurring algorithm according to the present invention. Thus, FIGS. 6(*a*)-6(*l*) and FIGS. 7(*a*)-7(*l*) clearly show that the image de-blurring algorithm according to the present invention provides excellent details with the least noise and ringing artifacts.

It will be understood by those skilled in the field that all or part of steps of various methods according to the embodiments may be programmed to instruct the associated hardware to achieve the goals, which may be stored in a readable storage medium of computer, e.g. read-only memory, random access memory, disk, or CD.

The present invention has been described in detail with reference to the disclosed embodiments, which are merely for the purpose of understanding the present invention. The invention is not limited to the embodiments referred to, but may be varied and modified by those skilled in the field without departing from the idea of the present invention.

What is claimed is:

1. A method for image de-blurring, comprising:
   constructing an image pyramid model corresponding to an input image;
   estimating an intermediate image L, comprising:
   initializing the blur kernel;
   detecting an edge in a series of blurred images in the image pyramid, wherein a pixel value of the edge region is marked as a first value, wherein a pixel value of the smooth region is marked as a second value different from the first value;
   substituting the first value and the second value into a calculation model of the intermediate image L; and
   computing the calculation model in cyclic iterations to obtain a minimum value of the calculation model relative to the intermediate image L;
   wherein the step of computing the calculation model in cyclic iterations comprises:
   substituting an auxiliary variable for a gradient of the intermediate image L to transform the calculation model into an auxiliary model, wherein the auxiliary variable is used as an unknown variable and the auxiliary model is simplified as a first auxiliary model,
   wherein the first auxiliary model is calculated to obtain the auxiliary variable;

treating the intermediate image L as an unknown variable and simplifying the auxiliary model as a second auxiliary model, wherein the second auxiliary model is calculated to obtain the intermediate image L; and iteratively repeating calculations on the first auxiliary model and the second auxiliary model until an intermediate image L is obtained;

computing the intermediate image L, comprising: marking an edge region and a smooth region in the input image; and constraining the edge region and the smooth region to obtain the intermediate image L, wherein the input image is an original blurred image;

estimating a blur kernel k, comprising: extracting salient edges from the intermediate image, wherein the salient edges have their edge sizes larger than a scale of the blur kernel k; and calculating the blur kernel k using the salient edges; and restoring the input image, comprising: performing non-blind deconvolution on the input image and the estimated blur kernel k; and restoring the input image to a clear image.

2. The method of claim 1, wherein the step of estimating the blur kernel k comprises:

extracting a salient edge X in the intermediate image L using the Related Total Variation (RTV) structure extraction algorithm; setting a truncation parameter t to remove minor edges and noise in the salient edge X obtaining an edge gradient image $\nabla S$ for blur kernel k estimation, wherein the blur kernel k is calculated using the edge gradient image $\nabla S$ in combination with a sparse constraint and a smooth constraint.

3. The method of claim 2, wherein the step of restoring the input image comprises:

conducting impact filtering the blurred image I to obtain an image $\mathcal{Y}_0 \tilde{I}$;

computing deconvolution of the estimated blur kernel k and the image $\mathcal{Y}_0 \tilde{I}$ to obtain a first image $L_1$ using non-blind deconvolution algorithm of the hyper-Laplacian model;

computing deconvolution of the estimated blur kernel k and the image $\mathcal{Y}_0 \tilde{I}$ to obtain a first image $L_2$ using non-blind deconvolution algorithm of TV-$L_2$ model; and calculating a mean of the first image $L_1$ and the second image $L_2$ to obtain a restored clear image.

4. A system for image de-blurring, comprising:

a first estimation module configured to mark an edge region and a smooth region in an input image and to constrain the edge region and the smooth region to obtain an intermediate image L, wherein an input image is an original blurred image;

a second estimation module configured to extract a salient edge from the intermediate image, wherein the salient edge has their edge sizes larger than a scale of a blur kernel k, wherein the second estimation module is configured to calculate the blur kernel k using the salient edge; and a restoring module configured to perform non-blind deconvolution on the input image and the estimated blur kernel k and to restore the input image to a clear image, wherein the restoring module comprises:

a filter unit configured to conduct impact filtering of the blurred image I to obtain image $\mathcal{Y}_0 \tilde{I}^0$;

a first image calculation unit configured to perform a non-blind deconvolution algorithm of hyper-Laplacian model for deconvolution of the estimated blur kernel k and the image $\mathcal{Y}_0 \tilde{I}^0$ to obtain a first image $L_1$;

a second image calculation unit configured to perform a non-blind deconvolution algorithm of the TV-L2 model for deconvolution of the estimated blur kernel k and the image $\mathcal{Y}_0 \tilde{I}^0$ to obtain a second image $L_2$; and a restoring unit configured to calculate a mean of the first image L and the second image $L_2$ to restore the input image into a clear image.

5. The system of claim 4, further comprising:

a constructing module configured to construct an image pyramid corresponding to the input image.

6. The system of claim 5, wherein the first estimation module comprises:

an initial unit configured to initialize the blur kernel k;

a detection unit configured to detect the edge of a series of blurred images in the image pyramid, mark a pixel value of the edge region as a first value, and mark a pixel value of the smooth region as a second value different from the first value; and an operation unit configured to substitute the first value and the second value into a calculation model of the intermediate image L, and to conduct cyclic iterative computations using the calculation model to obtain a minimum value of the calculation model relative to the intermediate image L.

* * * * *